United States Patent
Burkhard et al.

[11] Patent Number: 6,009,366
[45] Date of Patent: *Dec. 28, 1999

[54] PROCESS FOR MONITORING A BRAKING SYSTEM WITH ANTILOCK SYSTEM AND ELECTRONIC BRAKING POWER DISTRIBUTION

[75] Inventors: Dieter Burkhard, Waldfischback-Burgalben; Norbert Ehmer, Eschborn; Thomas Proger, Rodermark; Alexander Volz, Dreieich; Gerhard Kunz, Bingen; Helmut Fennel, Bad Soden, all of Germany

[73] Assignee: ITT Manufacturing Enterprises Inc., Wilmington, Del.

[ * ] Notice: This patent is subject to a terminal disclaimer.

[21] Appl. No.: 09/091,789

[22] PCT Filed: Oct. 18, 1996

[86] PCT No.: PCT/EP96/04529

§ 371 Date: Nov. 12, 1997

§ 102(e) Date: Nov. 12, 1998

[87] PCT Pub. No.: WO97/23371

PCT Pub. Date: Jul. 3, 1997

[30] Foreign Application Priority Data

Dec. 23, 1995 [DE] Germany .......................... 195 48 703

[51] Int. Cl.$^6$ ...................................................... B60T 8/00

[52] U.S. Cl. .................................. 701/71; 701/79; 701/74; 701/70; 303/186; 303/187; 303/188; 303/121; 303/122; 180/197

[58] Field of Search ................................ 701/71, 78, 79, 701/70, 74; 180/197; 303/122.02, 122.06, 186, 121, 122, 122.05

[56] References Cited

U.S. PATENT DOCUMENTS 5,887,957  3/1999  Buttner et al. ........................... 303/186

FOREIGN PATENT DOCUMENTS

| | | |
|---|---|---|
| 3418044 | 4/1986 | Germany . |
| 3841958 | 6/1990 | Germany . |
| 3901923 | 9/1990 | Germany . |
| 4036940 | 8/1991 | Germany . |
| 4007360 | 9/1991 | Germany . |
| 4122282 | 1/1992 | Germany . |
| 4224971 | 2/1994 | Germany . |
| 4240493 | 6/1994 | Germany . |
| 4309243 | 9/1994 | Germany . |

OTHER PUBLICATIONS

English translation of the International Preliminary Examination Report for PCT/EP96/04529.

Primary Examiner—William A. Cuchlinski, Jr.
Assistant Examiner—Yonel Beaulieu
Attorney, Agent, or Firm—Rader, Fishman & Grauer PLLC

[57] ABSTRACT

A method of monitoring a brake system which is equipped with anti-lock control (ABS) and a system for electronic control of brake force distribution (EBV). The system includes two brake circuits in a black/white brake circuit split-up, the EBV function or control is principally released only when the vehicle deceleration exceeds a predetermined limit value (GWN). To identify a front-axle brake circuit failure, acceleration criteria, i.e., criteria responsive to the acceleration behavior of the vehicle wheels, are predetermined and monitored. Further, slip range monitoring in conjunction with acceleration range monitoring is performed. Upon 'detection' of an acceleration criterion or when a limit value (GW2) predetermined as an acceleration criterion is exceeded, and/or upon 'detection' of values which are outside the slip range (GW1) or the acceleration range (GW5), a 'suspected' front-axle brake circuit failure is signaled, and intervention into the electronic control of the brake force distribution (EBV) is performed.

15 Claims, 3 Drawing Sheets

PROCESS FOR MONITORING A BRAKING SYSTEM WITH ANTILOCK SYSTEM AND ELECTRONIC BRAKING POWER DISTRIBUTION

The present invention relates to a method of monitoring a brake system which is equipped with anti-lock control (ABS) and a system for electronic control of brake force distribution (EBV) and includes two hydraulically isolated brake circuits to which the wheel brakes of the wheels of one vehicle axle are respectively connected. The method involves that the EBV function is deactivated or the commencement of EBV control is prevented upon failure of the front-axle brake circuit.

Anti-lock systems (ABS) are presently considered already as standard equipment in high or medium price category vehicles. This applies increasingly also to small-size or low-cost passenger cars. Usually, the vehicles employ hydraulic brake systems having brake lines in which electrically operable hydraulic valves, i.e. pairs of inlet/outlet valves are inserted. The inlet valves permit closing or interrupting the pressure fluid conduit which leads from the master cylinder of the brake system to a wheel brake. In contrast thereto, the associated outlet valve which is closed in its inactive position permits a pressure fluid discharge from the wheel brake and, thus, pressure reduction. The most important input quantity of the control system (ABS) is the rotational behavior of the individual wheels which is typically sensed by way of a rotational speed sensor on each individual wheel. The braking pressure in the wheel brakes of the controlled wheels is controlled and modulated as a function of the rotational behavior of the individual wheels.

As is known, it is necessary to vary the brake force distribution to the wheel brakes of the front wheels in relation to the brake force conducted to the wheel brakes of the rear wheels in order to compensate for static and dynamic axle load shifts. Mechanical, invariably adjusted pressure reducing valves or load and/or deceleration-responsive brake force controllers, which are on the market in a great number of variations, have always been used for this purpose. It is now advisable to employ hydraulic valves of the above-mentioned type for controlling or adjusting the brake force distribution and to evaluate to this end the data about the rotational behavior of the individual wheels produced by wheel sensors. This applies in particular to vehicles with ABS in which hydraulic valves of the above-mentioned type, wheel sensors and electronic controllers are already provided.

An electronically controlled brake force distribution (EBV) is principally based on determining or calculating the slip difference, i.e., the difference between the brake slip of the front wheels and the brake slip of the rear wheels. With an optimal brake force distribution, the amount of slip on the front axle is somewhat higher than the slip on the rear axle so that, on the one hand, a relatively great contribution of the front wheels to the braking operation and, on the other hand, a high amount of driving stability is ensured. As is known, the rear wheels are able to generate high amounts of cornering force only at a relatively low slip.

In an electronic control of brake force distribution in conjunction with brake systems wherein the wheels of one axle are connected to a joint hydraulic brake circuit (this is the so-called black and white brake circuit split-up), early detection of a front-axle brake circuit failure is especially important for safety reasons. This is because the brake system must allow a minimum deceleration of the vehicle, as mandated by law, even in the event of such a brake circuit failure. Because the brake slip on the rear wheels is responsive to the slip of the front wheels when the EBV system is in operation, the braking pressure limitation by the EBV control would set in prematurely in the event of front-axle brake circuit failure and the consequence of the front wheels rotating in a 'slip-free' manner or at an extremely low slip. The stopping distance would become too long.

To increase the reliability in operation of a brake system with EBV, German patent application No. 42 24 971 (P 7363) discloses applying a short pressure reduction pulse to the front wheels during a braking operation. In the absence of a reaction to the pressure reduction pulse, there might be a defect on the front axle. This is why the EBV function is deactivated in this situation for safety reasons.

Detection of a front-axle brake circuit failure is of course also possible by means of a pressure sensor which identifies the absence of braking pressure in the front-wheel brakes despite a braking operation, signals this condition and triggers deactivation of the EBV function.

It is an object of the present invention to disclose a method of monitoring a brake system which permits early and reliable detection of the failure of the front-axle brake circuit even without using a braking pressure sensor of the above-mentioned type.

It has been found that this object can be achieved by the method described in claim 1, the special features thereof including that the EBV function is not released until the vehicle deceleration exceeds a predetermined limit value, that for a detection of a front-axle brake circuit failure acceleration criteria, i.e., criteria responsive to the acceleration behavior of the vehicle wheels, are predetermined and monitored, and slip range monitoring in conjunction with acceleration range monitoring is effected, and that upon 'detection' of an acceleration criterion or upon the exceeding of a limit value predetermined as acceleration criterion, and/or upon 'detection' of values which are outside the slip range or the acceleration range a 'suspected' front-axle brake circuit failure is signaled and intervention into the EBV control is performed.

In the event of a 'suspected' front-axle brake circuit failure, the control thresholds decisive for the triggering or the commencement of EBV will be raised. This changes the EBV control to the effect of a reduced triggering sensitivity or a later commencement. When failure is 'suspected' during a presently occurring EBV control, the control operation is terminated by a pulsed or continuous delivery of braking pressure into the rear-wheel brakes.

Thus, the present invention is based on the recognition that criteria and limit values can be derived from the wheel rotational behavior, i.e., the acceleration values and the wheel slip, which signal or express the imminent risk or a suspicion of a front-axle brake circuit failure if determined conditions are satisfied and values are exceeded. The fail condition is suspected at a very early moment. This obviates the need for sensors to measure the actual pressure in the front-wheel brakes, with the result of material economy and increased safety and reliability in addition.

Upon the occurrence of such a suspected fail condition, the EBV control (depending on the situation) is terminated, instantaneously deactivated or changed to the effect of the rear wheels making an increased contribution to the braking operation.

When there is repeated occurrence of criteria or of limit values which are exceeded during a braking operation, or when the ignition is switched on, which is a confirmation of the initial suspicion, appropriately, the EBV function is deactivated for a certain time or until repair. If desired, the error may simultaneously be signaled.

If, however, after the occurrence of a suspected fail condition, measured values occur or criteria are satisfied which indicate an intact front-axle brake circuit, for example, a strong deceleration of the vehicle, or if ABS control cycles occur on the front axle, the suspected situation is eliminated again.

Some particularly preferred embodiments of the present invention are described in the subclaims.

Further features, advantages and possible applications of the present invention can be taken from the following description by way of the accompanying drawings and diagrams.

Figure 3A:
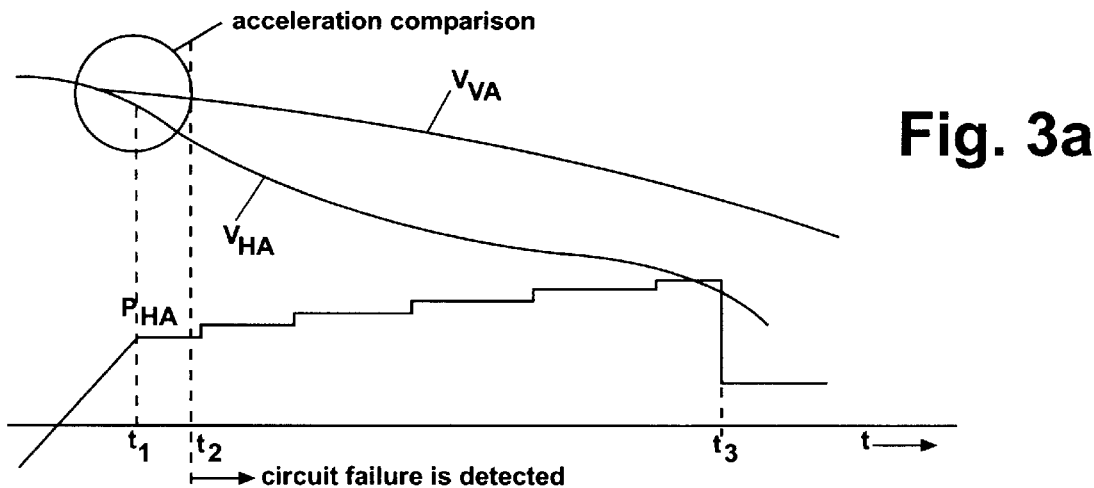
Figure 3B:
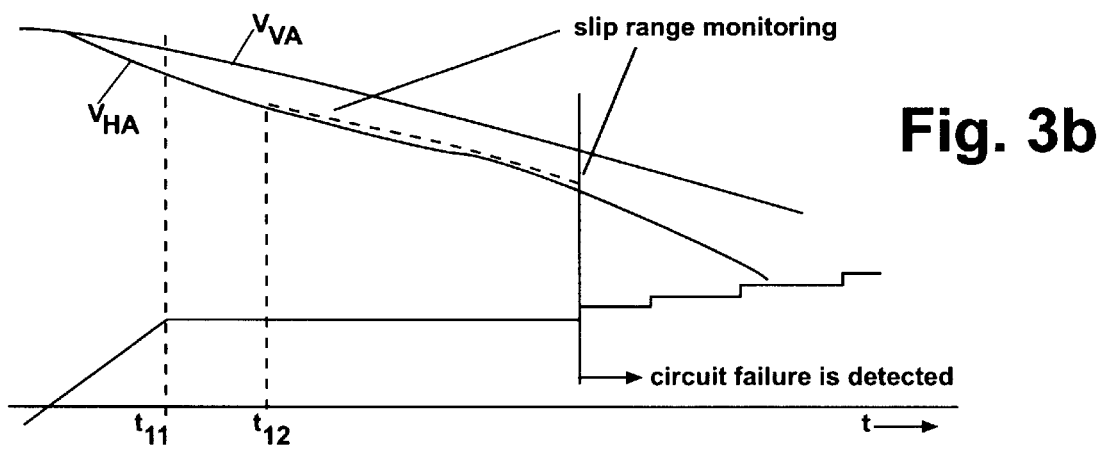
Figure 3C:
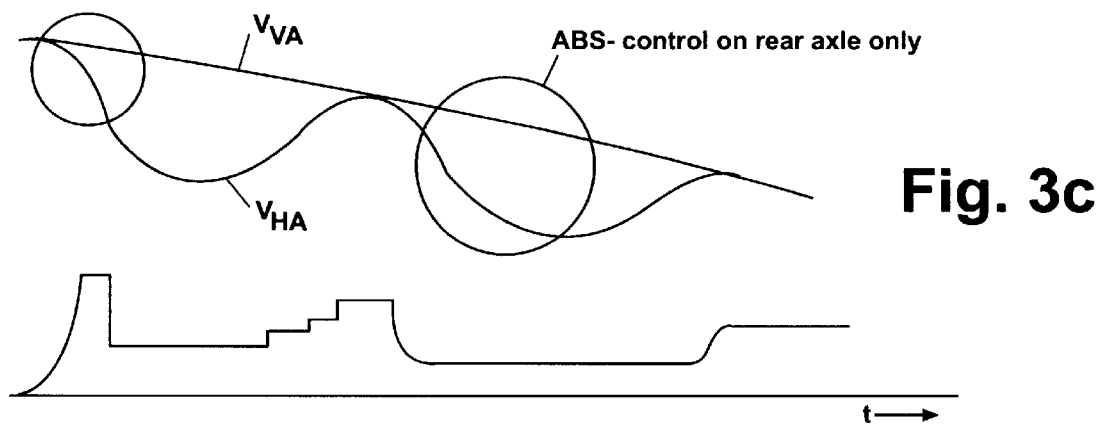

FIGS. 3a–c show diagrams to explain the mode of operation of the method of the present invention.

Figure 1:
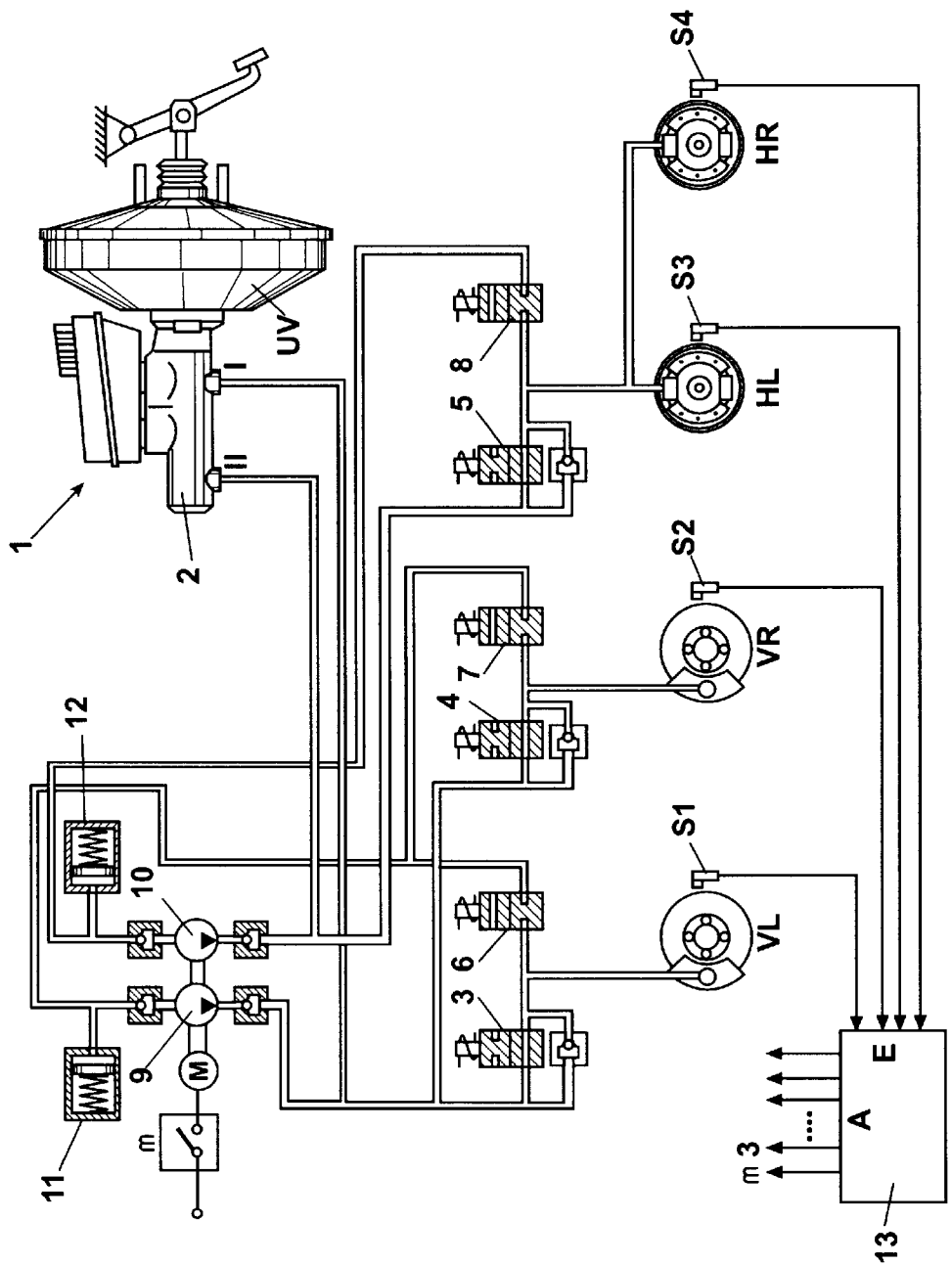
FIG. 1 is a simplified diagrammatic view of the most important components of a brake system including ABS and EBV.

FIG. 1 shows an embodiment of a brake system with ABS and EBV wherein the wheel brakes are connected to a dual-circuit braking pressure generator 1 in a so-called black/white brake circuit allotment. The braking pressure generator 1 comprises a tandem master cylinder 2 with a preceding vacuum booster UV. The two hydraulically isolated brake circuits of the master cylinder 2 are designated by I and II.

Electromagnetically operable hydraulic valves, i.e., inlet and outlet valves 3, 4, 5; 6, 7, 8, are inserted into the brake lines. Further, there is provision of a dual-circuit hydraulic pump 9, 10 with a joint electric motor M and low-pressure accumulators 11, 12. Also, the brake system is equipped with sensors S1 to S4 on each individual wheel. The signals of the sensors are sent to an input E of an electronic controller 13. The sensor signals are the most important input quantities of the control system shown.

The sensor signals are processed in the controller 13, and braking pressure control signals are produced. The braking pressure control signals are sent to the electrically operable hydraulic valves 3 to 8 by way of the represented outputs A of controller 13 and to the drive motor M of the hydraulic pump 9, 10 by way of the output m.

The pressure fluid which is discharged in the braking pressure reduction period by way of the outlet valves 6 to 8 is returned into the brake circuits I, II by way of the hydraulic pumps 9, 10 which are switched on during anti-lock control operations (ABS function). The low-pressure accumulators 11, 12 are used as intermediate accumulators in the pressure reduction period.

The two front wheels VL, VR are connected to the brake circuit I by way of one pair of inlet/outlet valves 3, 6; 4, 7 each. The rear wheels HL, HR are connected to the brake circuit II by way of a joint valve pair 5, 8. Thus, the brake system has a black and white circuit split-up.

The electronic control of brake force distribution to the front wheels and the rear wheels (EBV function) is also effected by way of controller 13 which evaluates the data about the rotational behavior of the individual wheels produced by wheel sensors S1 to S4 and supplied by way of input E.

One embodiment of the basic design of the electronic controller 13 which performs the ABS and EBV functions will be explained hereinbelow by way of the circuit arrangement shown in FIG. 2.

The circuit arrangement shown is used both for anti-lock control (ABS) and the electronic control of brake force distribution (EBV). The input data of this control system is produced by means of wheel sensors S1 to S4 which, after conditioning in a circuit 14, issue signals representative of the speed variation of the individual wheels, i.e., speeds $v_1$ to $v_4$.

It is of no significance to the principal mode of operation of the method of the present invention whether the sensor signals are produced by a circuit of the illustrated type on the basis of hard-wired logic, by data processing with the aid of microcomputers, or the like, or by a combination of both systems. The circuit arrangement shown was realized by means of programmed circuit systems, especially microcomputers.

Figure 2:
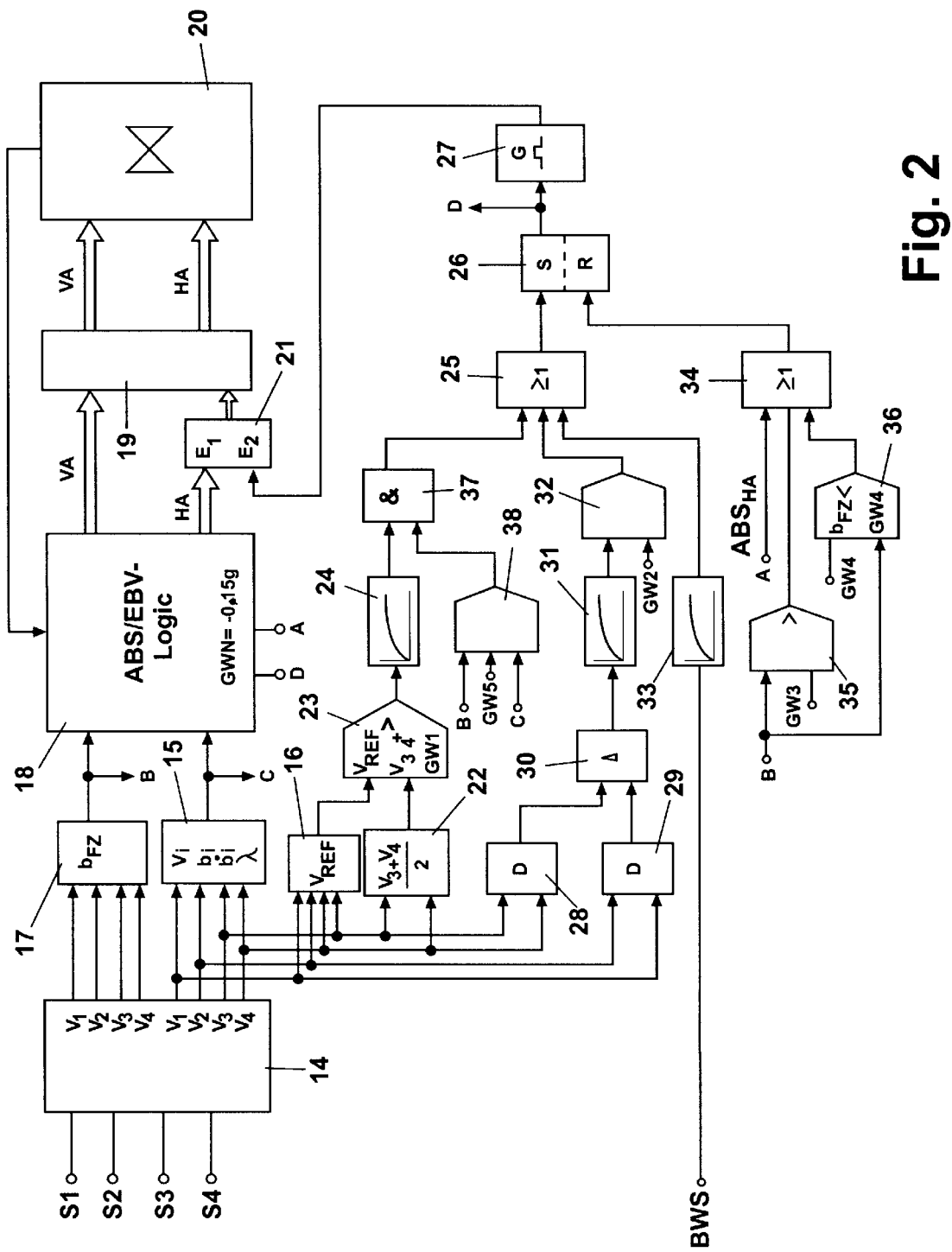
FIG. 2 is a circuit for implementing the method of the present invention.

In the embodiment of FIG. 2, the wheel speed signals $v_i$ (i=1 . . . 4) are evaluated in a circuit 15. Mainly the wheel decelerations or accelerations $b_i$, the variations of these quantities $\beta_i$ (also termed as 'jerk') and the slip $\lambda_i$ of the individual wheels is calculated. To determine the wheel slip, a vehicle reference speed $V_{REF}$ is taken into account which is produced in a circuit 16 in a known manner by logically combining the wheel speed signals $v_i$.

In addition, the vehicle deceleration or acceleration b, is calculated in the present embodiment from the wheel speed signals $v_i$ in a separate circuit or program block 17. Exactly as the wheel-responsive signals produced in the evaluating circuit 15, the vehicle deceleration or acceleration is sent to an ABS/EBV logic 18. Electric signals for the control of actuators are produced in the logic 18 from the input data by employing complex control algorithms, preferably by means of programmed circuits and circuit systems, such as microcomputers. The actuators are configured as hydraulic valves 3 to 8 in the FIG. 1 embodiment. In the circuit shown in the FIG. 2 embodiment, the output signals of the ABS/EBV logic 18 are initially sent to a valve actuation control 19 wherein the actual control signals for the actuators 20 or hydraulic valves (3 to 8 in FIG. 1) are generated.

The signal paths for the front-wheel brakes VA (VL, VR) and for the rear-wheel brakes HA (HL, HR) are separated, as shown in FIG. 2, because in specific situations there is intervention into the rear-wheel brake control by way of a circuit 21. This is effected by the circuits to be described hereinbelow which are required for implementing the method of the present invention.

The circuit arrangement of FIG. 2, like in FIG. 1, is a part of a brake system with a black/white circuit split-up and a front-wheel drive.

According to the present invention, EBV control is principally allowed only after the vehicle exceeds a defined deceleration limit value GWN which, for example, ranges between −0.1 g and −0.2 g and amounts to approximately GWN=−0.15 g in the present case. The ABS/EBV logic 18 or the program parts represented by this logic ensure that this condition is adhered to.

Besides, acceleration criteria, a slip range, and an acceleration range are predetermined and monitored according to the present invention. The circuit blocks required for this purpose are also represented in a simplified manner in FIG. 2.

An adder or averaging unit 22, along with the circuit 16 which determines the reference speed $V_{REF}$, a comparator 23 and a low-pass filter 24 is used for slip range monitoring. When a slip difference between the front and the rear axles (which is herein calculated in the comparator 23 by comparison of the rear-wheel speed average value as an output signal of the circuit 22 with the vehicle reference speed $V_{REF}$ as an output signal of the circuit 16) is exceeded by a predetermined limit value GW1, and if this condition lasts until a signal prevails at the output of the low-pass filter 24, slip range monitoring will respond. This means that a flipflop 26 is triggered by an OR gate 25 when an AND-condition predetermined by a gate 37 is satisfied. When the flipflop 26 is set, a pulse generator 27 is activated. The pulse generator 27 controls valves within valve block 20, which are associated with the rear-wheel brakes, by way of the circuit 21 which is a multiplexer, and by the valve actuation control 19.

The slip limit value GW1 amounts to 1% approximately in the present embodiment. This means that the slip of the front wheels may only be in excess of the rear-wheel slip by at most 1%. In this example, the reference speed $V_{REF}$ is evaluated. In the event of front-wheel circuit failure, $V_{REF}$ represents the average speed of the front wheels.

The time constant of the low-pass filter 24 amounts to roughly 500 msec. The pulse generator 27 causes a pulsed actuation and opening of the inlet valves in the line leading to the rear-wheel brakes, for example, for the actuation of the hydraulic inlet valve 5 which is common to both rear wheels in the embodiment of FIG. 1.

Slip range monitoring is connected to an acceleration range monitoring system in the present invention. The vehicle acceleration $b_{FZ}$ introduced by way of a connection 'B' is compared with the accelerations $b_i$ (i=1 ... 4) of the individual vehicle wheels i in a comparator 38. '$b_i$' prevails at the output of the evaluating circuit 15 and is sent to the comparator 38 by way of connection 'C'.

When the acceleration $b_i$ of each wheel is within a range which is predetermined by a maximum discrepancy GW5 of e.g. ±0.15 g related to the vehicle acceleration or deceleration $b_{FZ}$, the way to the OR gate 25, the flipflop 26 and the pulse generator 27 is released by the AND gate 37.

An acceleration criterion is monitored or 'detected' by means of circuit blocks 28 to 32 in FIG. 2. In each case, the averaged rear-wheel acceleration (in differentiating stage 28) and the front-wheel acceleration (in stage 29) are calculated in differentiating stages 28, 29. The difference between the two averaged acceleration values is then calculated in a subtractor 30. After a low-pass filter 31 has been passed, having a time constant of roughly 140 msec in the present embodiment, the filtered difference value is compared in the comparator 32 with a predetermined acceleration limit value GW2 of 0.15 g, for example. When the filtered difference value of the averaged rear-wheel and front-wheel accelerations exceeds the limit value GW2, this causes again actuation of the pulse generator 27 by way of the OR gate 25 and the flipflop 26, with the result of the above-mentioned effects on the braking pressure variation on the rear wheels.

A signal path connected to a reservoir alarm switch BWS leads to the third input of the OR gate 25. A BWS signal filtered in another low-pass filter 33 also causes actuation of the pulse generator 27. A BWS signal is triggered in a hydraulic brake system when (due to leakage in the hydraulic system, for example) the brake fluid level in a hydraulic reservoir or the brake fluid quantity in the system declines to a critical value. In the present case, mainly the quantity of brake fluid in the front-axle brake circuit is monitored, and a BWS signal is triggered when an error occurs in the front-axle brake circuit.

However, the flipflop 26 can actuate the pulse generator 27 only until a reset signal is triggered at the reset input of the flipflop 26 or at the output of an OR gate 34. The OR gate 34 has three inputs. The instantaneous vehicle acceleration or deceleration $b_{FZ}$ is compared with limit values GW3 and GW4 by way of a connection B and by comparators 35, 36. GW4 amounts to 0.5 g, for example, GW3 amounts to roughly 0 g. Thus, the limit value GW4 is reached when the vehicle is braked to a relatively great extent, which indicates intact front-axle and rear-axle circuits. The exceeding of GW3 indicates that the braking operation is terminated and the vehicle accelerates.

By way of a third input which is designated by 'A' and is connected to an output of the ABS/EBV logic, the OR gate 34 is actuated as soon as anti-lock control is effected at any one or both of the rear wheels. Actuation of the pulse generator 27 is of course inappropriate in this situation.

Further, the flipflop 26 is reset, or the reset input of the flipflop is triggered when ABS control cycles are identified repeatedly on the front wheels, for example, two times. Such control cycles indicate that the front-axle brake circuit must be fail-free. For the sake of clarity, this signal path is not shown in FIG. 2. Still further conditions are possible which indicate an intact front-axle brake circuit and, therefore, can be evaluated to reset or retain the flipflop 26.

The fact that the various, above-mentioned conditions which induce a signal at the OR gate 25 are satisfied is interpreted in the method of the present invention as a 'suspected' front-axle brake circuit failure and, in the absence of a reset signal cause stage 26 to flip and thereby provide a pulsed or continuous rise of the braking pressure in the rear-wheel brakes. An input $E_2$ of the multiplexer 21 has priority over input $E_1$ so that braking pressure introduction is initiated by means of the output signals of the generator 27 irrespective of the actuation of the hydraulic valves by the logic 18.

When failure is 'suspected' outside a presently occurring EBV control operation, the control thresholds are raised or the response sensitivity of the EBV control is reduced by way of the circuit 21 or the ABS/EBV logic 18 in order that, as long as the suspected failure exists, a higher (compared to EBV controlled braking) braking pressure acts upon the rear-wheel brakes and the share of the rear-wheel brakes in the braking operation is thus increased. To this end, the 'suspected' failure is signaled to the ABS/EBV logic 18 (input D) by way of an output 'D' of the flipflop 26. The triggering thresholds of the EBV control are subsequently increased from a 'normal value' of GWN=−0.15 g, for example, to a value between −0.3 g and −0.5 g, especially to a value of roughly −0.35 g. Thus, EBV control becomes 'less sensitive', or EBV control commences at a later moment, i.e., not until a greater deceleration.

The embodiments of FIGS. 3a–c show a typical wheel rotational behavior upon a front-axle brake circuit failure and different types of braking operation. The examples relate to a vehicle with a front-axle drive.

In the FIG. 3a embodiment, the rotational behavior of the wheels on the front axle VA is compared to the behavior of the wheels on the rear axle HA in the event of medium to intense application of the brake or braking operation with medium to high pedal force. The braking pressure variation $p_{HA}$ on the rear axle, i.e., in the wheel brakes of the rear wheels, is also shown.

Due to a front-axle brake circuit failure, a difference in speed between the rear wheels ($v_{HA}$) and the front wheels ($v_{VA}$) is produced in the situation of FIG. 3a. At time $t_1$, an acceleration or slip threshold is exceeded which triggers that the braking pressure on the rear axle $p_{HA}$ is maintained constant.

An acceleration criterion is identified at time $t_2$ in the situation and the embodiment to which FIG. 3a relates. It is determined in comparator 32 by evaluating the difference in acceleration, i.e., the difference between the averaged rear-wheel acceleration and the averaged front-wheel acceleration (this is effected by means of the differentiators 28, 29 and the subtractor 30 in FIG. 2), and after filtering of the difference signal by means of the low-pass filter 31 that the acceleration criterion is satisfied and, thus, there is a 'suspected' failure of the front-axle circuit. Due to this suspicion, only a relatively flat braking pressure rise is still allowed in the wheel brakes of the rear wheels, as is shown in the braking pressure variation $p_{HA}$ in the FIG. 3a embodiment.

Braking pressure reduction on the rear axle becomes necessary due to a 'normal' anti-lock control operation at time $t_3$ in the embodiment of FIG. 3a.

In the embodiment of FIG. 3b which applies to a brake application with a low impact or low pedal forces, the front-axle brake circuit failure can be determined by slip range monitoring rather than by acceleration criteria. At time $t_{11}$, an acceleration or slip threshold is exceeded, with the result that the rear-axle braking pressure $p_{HA}$ is maintained constant. At time $t_{12}$, slip range monitoring is triggered in the embodiment or the situation of FIG. 3b. As is shown by the broken line starting at time $t_{12}$, the difference between the speed characteristic curves $v_{VA}$ and $v_{HA}$ ($v_{VA}$ is identical with the vehicle (reference) speed $V_{REF}$ in this case because the front-axle brake circuit has failed) exceeds the predetermined limit value so that circuit failure or suspected circuit failure is identified after a specific period of time. This period of time is defined in the FIG. 2 embodiment by a low-pass filter 24 having a time constant which can amount to 500 msec, for example. Due to this suspected front-axle circuit failure, a braking pressure rise (pHA) in the rear-wheel brakes with a flat gradient is triggered in the situation of FIG. 3b.

The embodiment of FIG. 3c shows an example of the wheel rotational behavior at a medium to strong pedal depression and failure of the front-axle brake circuit. Due to the incipient ABS control, the braking pressure on the rear wheels is adjusted to a value which is favorable for the braking operation in this example. In this case, as a result of the ABS control on the rear axle, the circuit according to the present invention will not intervene into the braking operation.

We claim:

1. Method of monitoring a brake system of the type including an anti-lock control (ABS) and a system of electronic control of brake force distribution (EBV) and two hydraulically isolated brake circuits to which the brakes of the wheels of one axle are respectively connected, wherein the EBV function is deactivated upon failure of the front-axle brake circuit, said method comprising the steps of:

(A) providing a brake system including an anti-lock control (ABS) and a system of electronic control of brake force distribution (EBV);

(B) determining vehicle deceleration; and (C) releasing the EBV function control when vehicle deceleration exceeds a predetermined limit value (GWN).

2. The method of claim 1, wherein step A includes the substeps of:

(i) comparing acceleration against a predetermined value, and (ii) comparing slip range against a predetermined value, and (iii) comparing acceleration range against a predetermined value.

3. Method as claimed in claim 1, wherein (GWN) ranges between −0.1 g and −0.2 g.

4. Method as claimed in claim 1, further including the step of (D) raising the control thresholds (GWN) decisive for the triggering of EBV upon the occurrence of a suspected front-axle brake circuit failure.

5. Method as claimed in claim 4, further including during a presently occurring EBV control, terminating the control operation by a pulsed or continuous delivery of braking pressure into the rear-wheel brakes upon the occurrence of a suspected front-axle brake circuit failure.

6. Method as claimed in claim 1, further including the step of signalling front-axle brake circuit failure when an acceleration criterion is 'identified', when there is a value which is outside the slip range or the acceleration range, or when there remains an insufficient fluid quantity in the front-axle brake circuit.

7. Method as claimed in claim 1, further including removing braking pressure reduction in the rear-wheel brakes when the vehicle deceleration is below a predetermined limit value, and the limit value range is between −0.3 g and −0.5 g.

8. Method as claimed in claim 1, further including the step of:

establishing that the difference between the averaged front-wheel acceleration and the averaged rear-wheel acceleration is predetermined as an acceleration criterion, and a limit value (GW2) in the order between 0.1 g and 0.3 g, is fixed for this difference at a vehicle deceleration ranging between roughly −0.1 g and −0.5 g, and exceeding of this limit value is assessed as a 'detection' of the acceleration criterion.

9. Method as claimed in claim 8, further including the step of:

establishing that the difference between the averaged front-wheel acceleration and the averaged rear-wheel acceleration is filtered with a time constant in the order between 100 and 300 msec.

10. Method as claimed in claim 1, further including the step of:

during EBV control, during straight travel, and in the event of a vehicle deceleration below a predetermined limit value which ranges in the order between −0.4 g and −0.6 g, a slip difference between the front and rear axles for a filtering time in the order of between 300 and 1000 msec of a maximum of 1% to 3% is fixed as a permitted slip range which is monitored, and a filtered acceleration below ±0.1 g to 0.3 g approximately for each wheel is predetermined as a permitted acceleration range.

11. Method as claimed in claim 10, further including the step of:

during EBV control, during straight travel, and in the event of a vehicle deceleration below a limit value of 0.5 g approximately, a slip difference between front and rear axles for a filtering time in the order of between 400 and 600 msec of a maximum of 1% approximately is fixed as a permitted slip range, and in that a filtered acceleration below ±0.15 g is predetermined as a permitted acceleration range.

12. Method as claimed in claim 1, further including the step of maintaining the effects of a front-axle brake circuit failure on the EBV control until reacceleration of the vehicle or until the occurrence of a vehicle decleration which exceeds a predetermined limit value (GW4) from about −0.4 g to −0.6 g.

13. Method as claimed in claim 1, further including the step of maintaining on the EBV control until the occurrence of a determined number of control cycles on the front wheels.

14. Method as claimed in claim 1, further including the step of terminating a front-axle brake circuit failure by deactivating the drive motor or switching off the ignition.

15. Method as claimed in claim 1, further including the step of counting repeated detection of the criteria which raise the suspicion of a front-axle brake circuit failure, and, deactivating the EBV function once said count exceeds a predetermined threshold.

* * * * *

UNITED STATES PATENT AND TRADEMARK OFFICE
CERTIFICATE OF CORRECTION

PATENT NO. : 6,009,366
DATED : December 28, 1999
INVENTOR(S) : Brukhard, Dieter, Norbert Ehmer, Thomas Proger, Alexander Volz, Gerhard Kunz and Helmet Fennel It is certified that error appears in the above-identified patent and that said Letters Patent is hereby corrected as shown below:

<u>Title page,</u>
In the Section 371 date, please change "1997" to -- 1998 --.

Signed and Sealed this

Fourteenth Day of May, 2002

*Attest:*

*Attesting Officer*

JAMES E. ROGAN
*Director of the United States Patent and Trademark Office*